Patented Mar. 19, 1940

2,193,819

UNITED STATES PATENT OFFICE 2,193,819

MEDICINAL WHITE OIL AND PROCESS OF PREPARING THE SAME

George Andreas Kessler, Petrolia, Pa., and Leo Liberthson, New York, N. Y., assignors to L. Sonneborn Sons, Inc., a corporation of Delaware No Drawing. Application December 9, 1937, Serial No. 178,884

4 Claims. (Cl. 167—66)

This invention relates to new and useful improvements in medicinal oils and process of preparing the same.

High viscosity medicinal oils and particularly white medicinal oils have a tendency upon storage to discolor and to acquire an objectionable odor and taste. We have discovered that such deterioration may be substantially prevented and that a medicinal oil of excellent storage qualities and improved taste, which retains its original sweetness for a comparatively long period of time, may be obtained by substantially removing occluded air from the oil and charging the oil with an amount of carbon dioxide sufficient to yield at 70° F. an oil absorbed carbon dioxide content of at least 0.1%.

For the purpose of accomplishing this result in accordance with the invention, we have found that the substantial removal of occluded air and the charging with carbon dioxide to the requisite extent may be simultaneously accomplished by charging the oil at least to the point of saturation with carbon dioxide at a low temperature range and preferably at a temperature range below 32° F. The lower limit of the effective charging temperature range is the solidification point of the oil, i. e., the point at which partial solidification of the oil occurs as it interferes with its proper agitation by the introduced carbon dioxide as well as with the proper absorption of the latter. The preferred effective charging temperature range in accordance with our discovery is, therefore, a temperature range between the solidification point of the oil and 32° F.

If desired, the oil may be precooled to the effective charging temperature range before passing the carbon dioxide through the same. Such precooling, however, may be dispensed with since the carbon dioxide absorption by the oil is endothermic in its nature so that by introducing the carbon dioxide into the oil at room temperatures and at a proper rate of introduction a rapid temperature drop to the desired effective charging range ensues. Once the effective charging temperature range is maintained, the further introduction of carbon dioxide should then be so adjusted that the temperature does not drop below the solidification point of the oil. Best results are in general obtained by passing the carbon dioxide into the oil under a pressure of approximately 30 pounds in excess of atmospheric throughout the charging operation.

The point of saturation requisite to yield at 70° F. an oil absorbed carbon dioxide content of at least 0.1% is ascertained by sampling the oil at suitable intervals during the charging operation; each sample is then left to stand in open communication with the atmosphere until it reaches a temperature of about 70° F. whereupon its oil absorbed carbon dioxide content is immediately determined by suitable methods such as titration. As soon as the oil absorbed carbon dioxide content is found to be 0.1% or higher the further charging may be discontinued as the oil is at this point sufficiently charged with carbon dioxide to the exclusion of occluded air.

The oil treated in the afore-described manner and containing at room temperature, i. e., at a temperature of about 70° F., a carbon dioxide content of at least 0.1%, possesses excellent storage qualities and is substantially free from objectionable deterioration for a comparatively long period of time. Where such oil, however, during storage, is exposed in communication with air for any length of time to temperatures materially in excess of 70° F., such as is the case in summertime or in tropical regions, the carbon dioxide content of the oil may drop materially below 0.1%, thus appreciably reducing its storage efficiency.

We have discovered in accordance with our invention and as a preferred embodiment thereof that the high storage efficiency of the oil may be substantially preserved even upon extended exposure to relatively high temperatures by charging the same with carbon dioxide at least to the point of saturation within the effective charging temperature range in a suitable container, preferably a pressure container, and to seal such container while the space above the level of the oil so charged is still substantially completely filled with carbon dioxide to the substantial exclusion of air and preferably while the temperature of the oil is still within or only slightly above the effective charging temperature range. If the container was sealed while the oil was still at a low temperature or was even sealed with the carbon dioxide in the container space under pressure in excess of atmospheric, the oil in the sealed container is under such circumstances supersaturated with carbon dioxide; such supersaturation will, of course, adjust itself automatically to a saturation yielding at 70° F. an oil absorbed carbon dioxide content of at least 0.1% as soon as the container is opened. Though not in all cases necessary, hermetical sealing is preferred. If the container space is filled with carbon dioxide under pressure and it is desired to substantially retain all of the carbon dioxide, hermetical sealing is essential.

A medicinal oil and particularly a medicinal white oil treated in this manner may be stored in its sealed container for long periods without danger of deterioration and regardless of any temperatures substantially in excess of 70° F. to which it may be exposed during storage. When opening the container for partial dispensation or use, the oil is the equivalent of a freshly charged product and will remain sweet for a considerable time after the opening of the container and as a rule sufficiently long to permit the dispensation or use of the entire contents of the vessel or container before any impairment of sweetness, taste or odor will be noticed.

The foregoing description is for purposes of illustration and not of limitation; and it is, therefore, our intention that the invention be limited only by the appended claims or their equivalent, wherein we have endeavored to claim broadly all inherent novelty.

We claim:

1. Process of preparing a high viscosity medicinal white oil of high storage qualities and improved taste which comprises charging said oil at least to the point of saturation with carbon dioxide within a temperature range between the solidification point of said oil and 32° F.

2. Process of preparing a high viscosity medicinal white oil of high storage qualities and improved taste which comprises charging said oil within a temperature range between the solidification point of said oil and 32° F. with carbon dioxide in amount sufficient to yield at 70° F. an oil absorbed carbon dioxide content of at least 0.1%.

3. Process of preparing a high viscosity medicinal white oil of high storage qualities and improved taste which comprises introducing carbon dioxide into said oil at a rate of introduction sufficient to thereby lower the temperature of said oil to at least 32° F., thereafter continuing the introduction of carbon dioxide at a rate sufficient to thereby substantially maintain a temperature range between the solidification point of said oil and 32° F. and in amount sufficient to yield at 70° F. an oil absorbed carbon dioxide content of at least 0.1%.

4. A high viscosity medicinal white oil of high storage qualities and improved taste which comprises a medicinal white oil substantially free from occluded air and containing carbon dioxide in amount sufficient to yield at 70° F. an oil absorbed carbon dioxide content of at least 0.1%.

GEORGE ANDREAS KESSLER.
LEO LIBERTHSON.